(12) United States Patent
Delarue et al.

(10) Patent No.: US 7,505,292 B2
(45) Date of Patent: Mar. 17, 2009

(54) DEVICE AND METHOD FOR CONTROLLING AN ELECTRIC POWER CONVERTER

(75) Inventors: Philippe Delarue, Roncq (FR); Philippe Le Moigne, Nomain (FR); Philippe Baudesson, La Buisse (FR); Patrick Bartholomeus, Hellemmes (FR); Xavier Cimetiere, Toufflers (FR)

(73) Assignee: MGE UPS Systems, Saint-Ismiers Cedex (FR)

( * ) Notice: Subject to any disclaimer, the term of this patent is extended or adjusted under 35 U.S.C. 154(b) by 407 days.

(21) Appl. No.: 11/288,379

(22) Filed: Nov. 29, 2005

(65) Prior Publication Data

US 2006/0139972 A1     Jun. 29, 2006

(30) Foreign Application Priority Data

Dec. 23, 2004   (FR)   .................................. 04 13872

(51) Int. Cl.
H02M 7/5387   (2007.01)
H02M 1/12    (2006.01)

(52) U.S. Cl. .............................. 363/132; 363/41; 363/98
(58) Field of Classification Search .................... 363/37, 363/40, 41, 45, 46, 47, 48, 56.02, 98, 132
See application file for complete search history.

(56) References Cited

U.S. PATENT DOCUMENTS 5,594,634 A * 1/1997 Rajashekara et al. .......... 363/98
5,657,216 A   8/1997 Kaura ......................... 363/41
5,757,636 A * 5/1998 Fletcher ....................... 363/98
2006/0077701 A1* 4/2006 Baudesson et al. .......... 363/132
2006/0187694 A1* 8/2006 Baudesson et al. .......... 363/132

OTHER PUBLICATIONS

Espinoza, J. et al, "On-line generation of gating signals for current source converter topologies," Industrial Electronics, 1993 Conference Proceedings, ISIE'93—Budapest, IEEE International Symposium on Budapest, Hungary, Jun. 1-3, 1993, New York, NY, IEEE, Jun. 1, 1993, pp. 674-678.
Kerkman, R.J. et al, "An overmodulation strategy for PWM voltage inverters," Industrial Electronics, Control, and Instrumentation, 1993. Proceedings of the IECON '93, International Conference on Maui, HI, Nov. 15-19, 1993, New York, NY, IEEE, Nov. 15, 1993, pp. 1215-1221.

* cited by examiner

Primary Examiner—Jessica Han
(74) Attorney, Agent, or Firm—Steptoe & Johnson LLP

(57) ABSTRACT

The control device of an electric power converter comprises a control device controlling turn-on of semi-conductor legs. The converter comprises DC voltage supply lines, an inverter connected between said lines and outputs. The control device comprises a processing unit to supply modulation signals of control signals of said inverter legs. The control device comprises a module for determining a general control component. The module for determining detects a detection signal representative of a highest current signal in absolute value. The detection signal is used to select a modulation signal on which an over-modulation is applied via the general control component. In the method, the detection signal is used to determine a general control component.

15 Claims, 7 Drawing Sheets

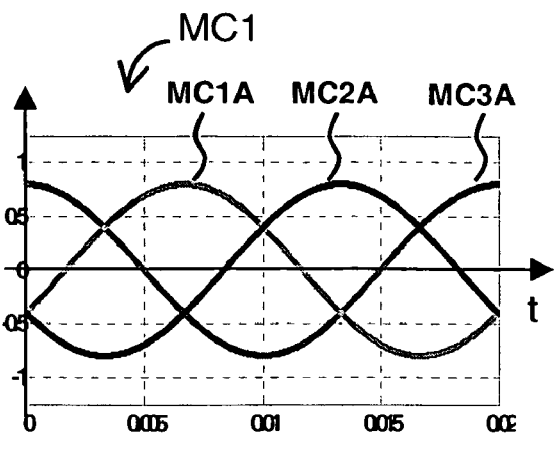
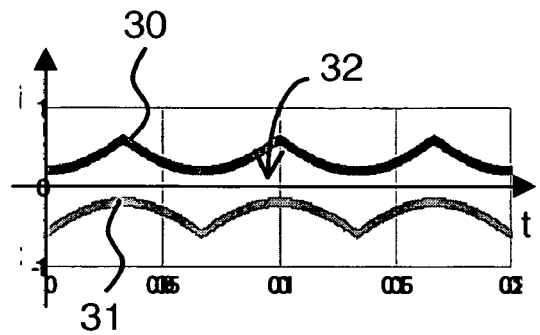
FIG. 8  FIG. 9
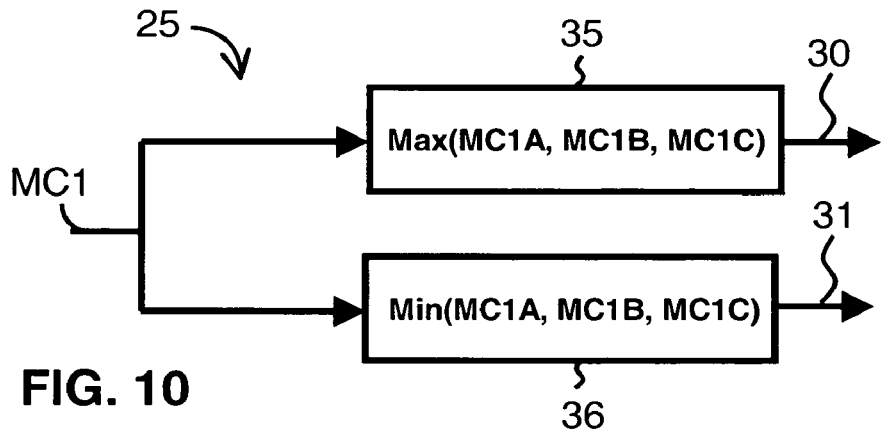
FIG. 10
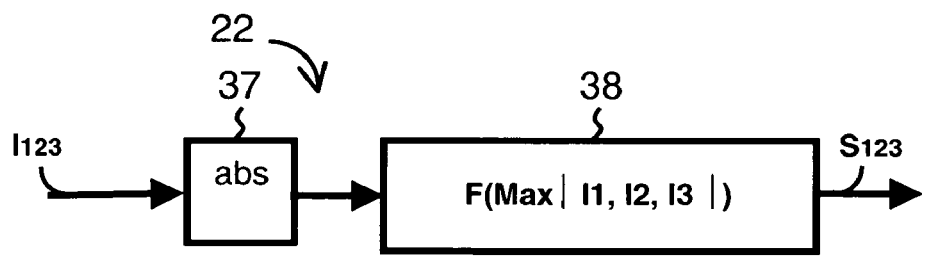
FIG. 11

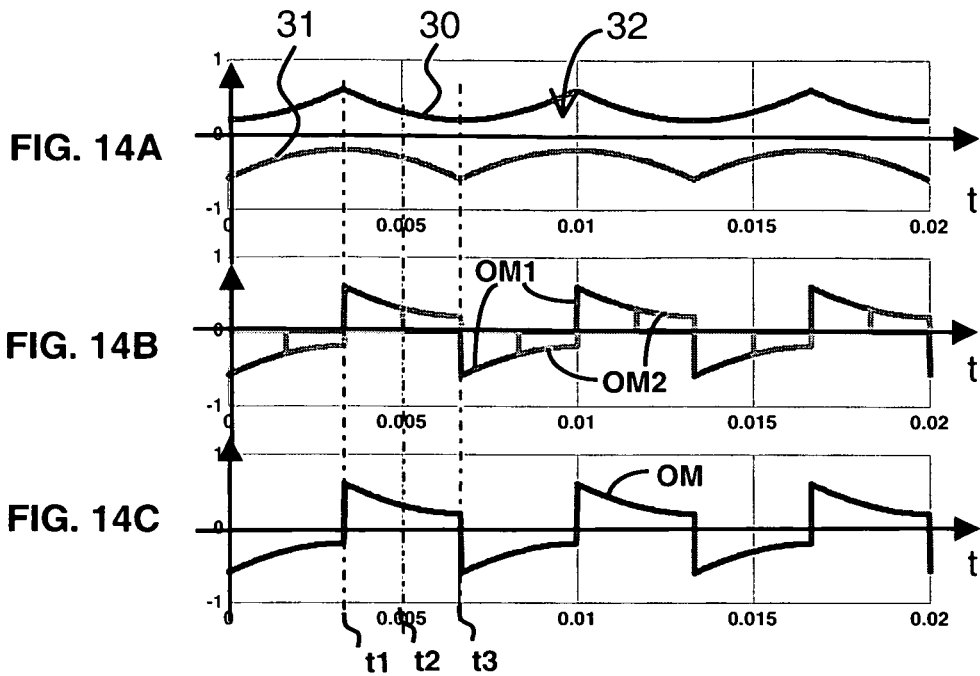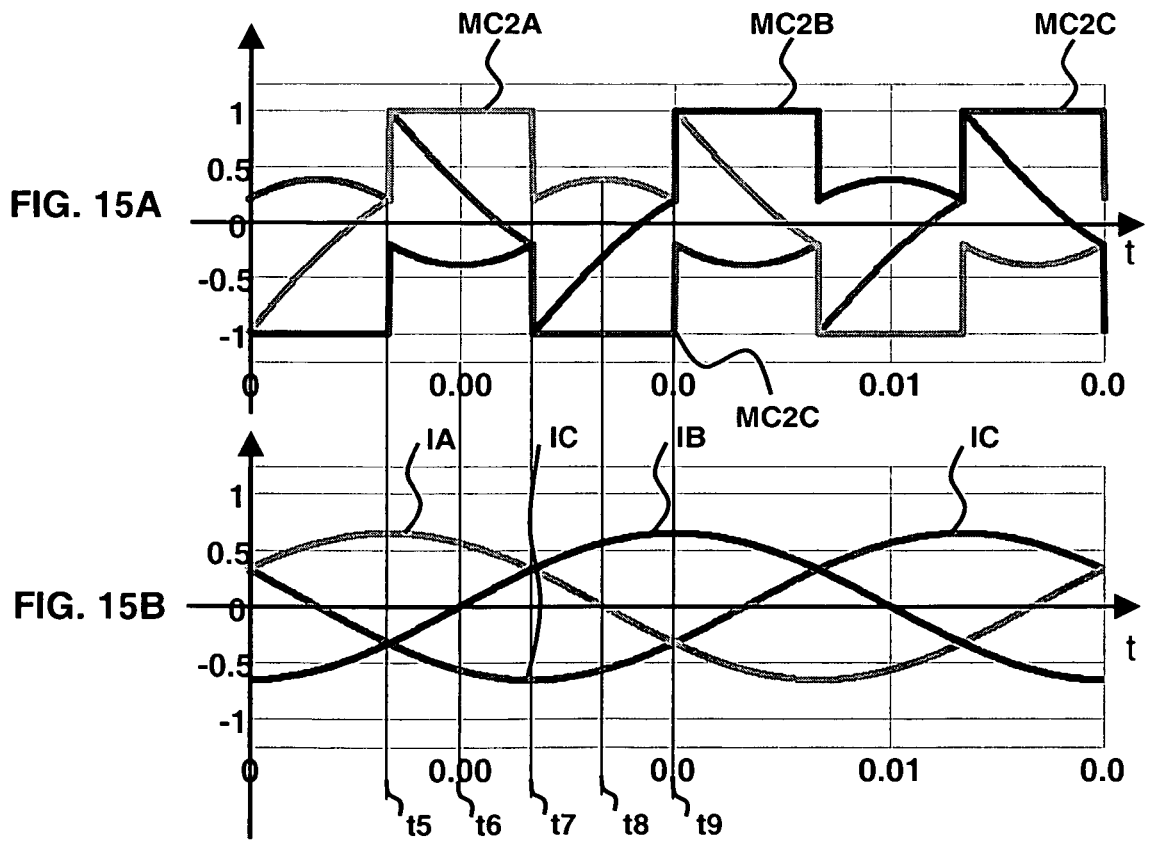

DEVICE AND METHOD FOR CONTROLLING AN ELECTRIC POWER CONVERTER

BACKGROUND OF THE INVENTION

Known electric power converters are used in particular in uninterruptible power supplies, and speed variators for electric motors or associated with power generators for coupling to a distribution system. Such a converter 1 represented in FIG. 1 generally comprises DC voltage VDC lines L1 and L2 and an inverter 2 formed by power semi-conductor legs 2A, 2B, 2C connected between the lines L1 and L2 to supply AC voltages VO on output to a load 3 or to an electric power distribution system. When the legs are controlled in high frequency, in particular in pulse width modulation, electric filters 4 can be fitted between the outputs of the legs 2A, 2B, 2C and the load 3 or power system. A voltage and current measuring device 62 arranged on output lines 61 supplies signals Vo and Io to the control circuit. Often a rectifier 5 connected between AC inputs VI and the lines L1 and L2 supplies the DC voltage VDC. Capacitors C1 and C2 connected to the lines L1 and L2 perform filtering of the DC voltage VDC.

FIG. 2 shows an example of a part of a processing unit 7 of a control circuit 6 to supply control signals of the legs. In this circuit, a regulator 8 enables three-phase modulation signals to be regulated and supplied according to reduced setpoints Cd, Cq, Co, in particular by a Park or Concordia transform in the dqo or $\alpha\beta$o domains. These known transforms and rotations are generally computed by means of matrices respectively called Park and Concordia matrices. Signals MC1 for each phase on output of the regulator are preferably used for intersective type modulation on a triangular high-frequency carrier signal enabling pulse width modulation. In the diagram of FIG. 2, the regulator 8 supplies first three-phase modulation signals MC1, a module 9 determines signals of general control component OM comprising an over-modulation to be applied to the first signals MC1 with operators 10, a module 11 applies a reference voltage V2 to said signals MC1 by operators 12, and a module 13 supplies a high-frequency signal designed to be modulated by modulation signals MC2 modified by the operators 10 and 12. Operators 14 combine the modulation signals MC2 with preferably triangular high-frequency signals F1 to supply control signals CVA, CVB and CVC of the inverter legs 2A, 2B, 2C in pulse width modulation format. As the leg controls are preferably binary on-off commands, a conditioning circuit 16 shapes the control signals. The over-modulation signals OM are generated by the modulation signals MC1 and by the type of over-modulation. The reference signal V2 is generally representative of a DC voltage, for example half of the voltage VDC of the lines L1 and L2.

In known converters, the module 9 determines signals of general control component OM according to modulation signals MC1 and to a signal representative of a phase shift, for example an angle or a cosine $\phi$ between an output voltage Vo and current Io. An example of a module 9, represented in FIG. 3, shows the use of a signal representative of phase shift to act on the lead or lag of the general control component signal. Output current Io and voltage Vo signals are applied to a module 20 to compute a signal representative of a phase shift which will be supplied to the module 9 for determining the general control component.

In known devices of the state of the art, the use of signals representative of a phase shift to determine the general control component does not enable efficient over-modulation management to be achieved. The phase shift signals are in fact no longer usable when the loads are not balanced and/or non-linear. A phase shift signal for all of the three phases leads to errors of appreciation. Furthermore the use of a phase shift signal no longer enables high-performance over-modulation to be applied if the current-voltage phase shift exceeds a certain value, for example an angle greater than $\pm\Pi/6$.

SUMMARY OF THE INVENTION

The object of the invention is to provide a device and a method for control of an electric power converter and a converter comprising a device enabling efficient over-modulation even with unbalanced, dephased or non-linear currents.

In this specification, the terms "general control component" and "common control component" may be used interchangeably and refer to a specific signal or set of signals.

In a control device according to the invention, means for determining a common control component comprise means for detecting current flowing in the outputs of the legs of said converter to be used to select at least one modulation signal receiving an over-modulation. The means for determining a common control component determine the common control component according to the first modulation signals and according to the detection signal detected by the current detecting means.

Preferably, the detection signal is representative of an output line or of a phase in a three-phase power system.

Preferably, the current delivery means detect instantaneous current, quasi-instantaneous current, or current signals with a small lag or a very low integration. A small lag is a short delay caused by electronic circuitry.

In a preferred embodiment, the current detecting means detect a first detection signal representative of a highest current in absolute value to supply a first detection signal acting as an over-modulation reference, the means for determining a common control component comprising first processing means to supply a first common control component with over-modulation dependent on the first detection signal or on a modulation signal selected according to the detection signal.

Advantageously, the means for determining a common control component comprise means for controlling limiting of the common control component.

Preferably, the means for controlling limiting receive modulation signals to supply negative and positive limiting values defining a limiting zone.

In a particular embodiment, the current detection means detect a second high current lower than the highest first current in absolute value to supply a second detection signal acting as over-modulation reference, the means for determining a common control component comprising second processing means to supply a second general control component with over-modulation dependent on the second detection signal or on a second modulation signal selected according to the second detection signal.

According to a first alternative embodiment, the means for controlling limiting receive: a first signal representative of the first detection signal or of a modulation signal selected according to the first detection signal, a second signal representative of the second detection signal or of a modulation signal selected according to the second detection signal, and a control signal representative of a risk of over-modulation overshoot supplied by means for detecting an overshoot.

The means for controlling limiting supply a selected detection or modulation signal representative of the first detection signal if a risk of overshoot is not detected or representative of said second detection signal if a risk of overshoot is detected to determine a common control component.

According to a second alternative embodiment, the means for controlling limiting receive: a first signal representative of a first common control component dependent on said first detection signal, a second signal representative of a second common control component dependent on said second detection signal, and a control signal representative of a risk of over-modulation overshoot supplied by means for detecting an overshoot.

The means for controlling limiting supply a common control component representative of the first common control component if a risk of overshoot is not detected or of the second common control component if a risk of overshoot is detected.

An electric power converter according to the invention comprises: DC voltage supply lines, conversion means having at least three legs connected between said DC voltage lines and outputs to convert the DC voltage into output AC voltages, and control means for controlling turn-on of said legs of the conversion means, comprising at least one control device as defined above and current measuring means arranged on output conductor lines and connected to the control device to supply signals representative of currents to said means for determining a common control component to be used in determining the common control component.

According to the invention, a method for controlling an electric power converter comprises:
detecting a detection signal representative of a line in which a highest current in absolute value is flowing, selecting a modulation signal for application of an over-modulation, and determining a common control component according to signals resulting from detection of the detection signal, and from selection of a modulation signal.

Advantageously, the method comprises computing limit values of the common control component or of over-modulation.

Advantageously, the method comprises controlling limiting of the general control component according to the limit values.

In a particular embodiment, the method comprises:
a first detection of a first detection signal representative of a line in which a highest current in absolute value is flowing,
a first selection of a modulation signal for application of an over-modulation,
a first determination of a first general control component according to signals resulting from the first detection of a first detection signal, and from the first selection of a modulation signal,
a second detection of a second detection signal representative of a line in which a high current lower than the first highest current in absolute value is flowing,
a second selection of a modulation signal for application of an over-modulation, and
a second selection determination of a second general control component according to signals resulting from the second delection of a second delection signal, and from the second selection of a modulation signal.

Preferably, the method comprises: computing limit values of the general control component or of over-modulation, controlling limiting the first common control component to detect a risk of overshoot of the limit values, and supplying a signal of a common control component representative of the first common control component if a risk of overshoot is not detected or of the second common control component if a risk of overshoot is detected.

BRIEF DESCRIPTION OF THE DRAWINGS

Other advantages and features will become more clearly apparent from the following description of particular embodiments of the invention, given as non-restrictive examples only and represented in the accompanying drawings in which:

FIGS. 8 and 9 represent signals used in modules for determining a general control component according to embodiments of the invention;
FIGS. 10 and 11 represent details of embodiments of processing modules in modules for determining a general control component according to embodiments of the invention;
FIGS. 14A, 14B, 14C, 15A and 15B represent signals used in control devices according to embodiments of the invention.

DETAILED DESCRIPTION OF PREFERRED EMBODIMENTS

Figure 1:
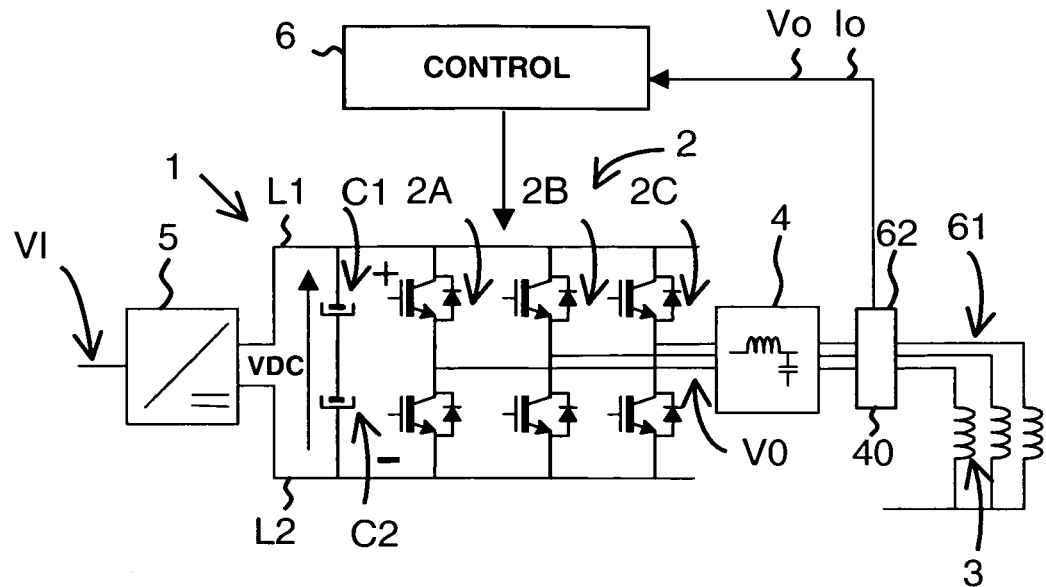
FIG. 1 represents a diagram of a converter of known type.
Figure 2:
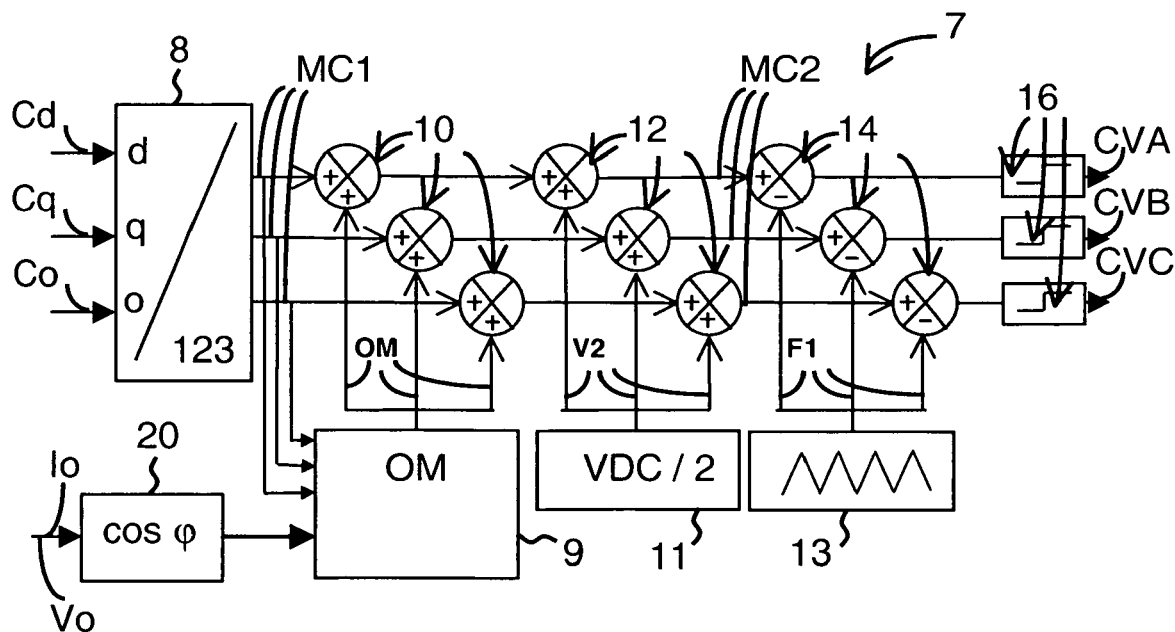
FIG. 2 represents a block diagram of a control circuit of a converter of known type.
Figure 3:
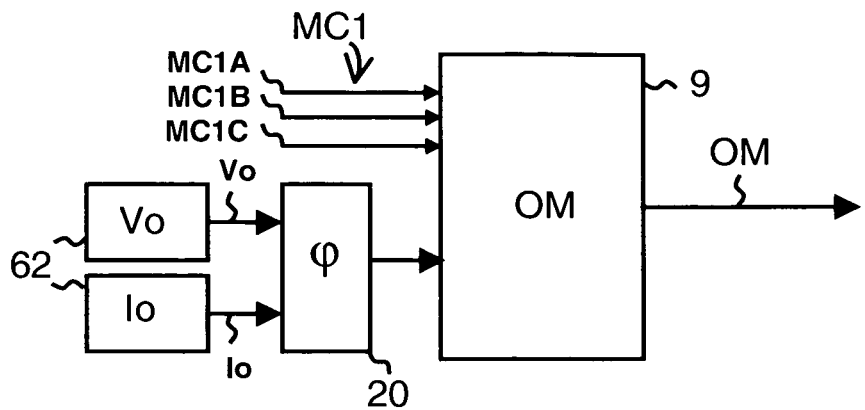
FIG. 3 represents a block diagram of a module for determining a general control component signal of known type.
Figure 4:
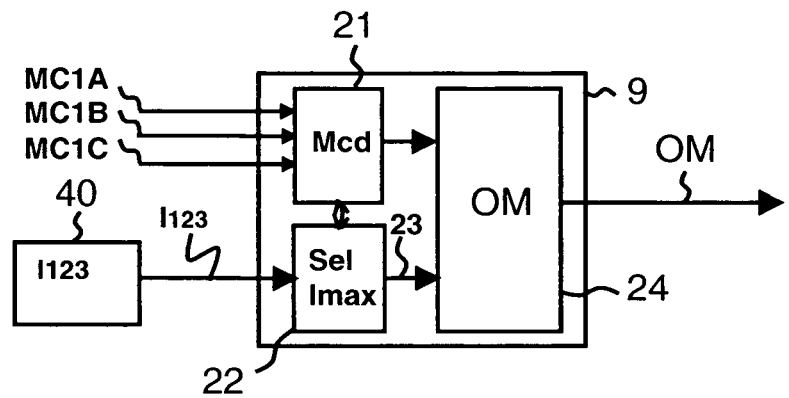
FIG. 4 represents a block diagram of a module for determining a general control component signal according to an embodiment of the invention.

In a control device according to an embodiment of the invention, a module 9 for determining the general control component represented in FIG. 4 comprises a processing module 21 for processing the modulation signals MC1 for example of the modulation signals of three phases MC1A, MC1B and MC1C, and a detection module 22 for detecting current signals $I_{123}$ supplied by a measuring circuit 40 to detect a detection signal 23 of the highest current in absolute value. The object of this selection is notably to know on which line or which phase the current is the highest. Thus, a module 24 connected to the modules 21 and 22 determines a value of the general control component OM with over-modulation with the modulation signals and with signals representative of the detected output line having the highest current in absolute value.

Figure 5:
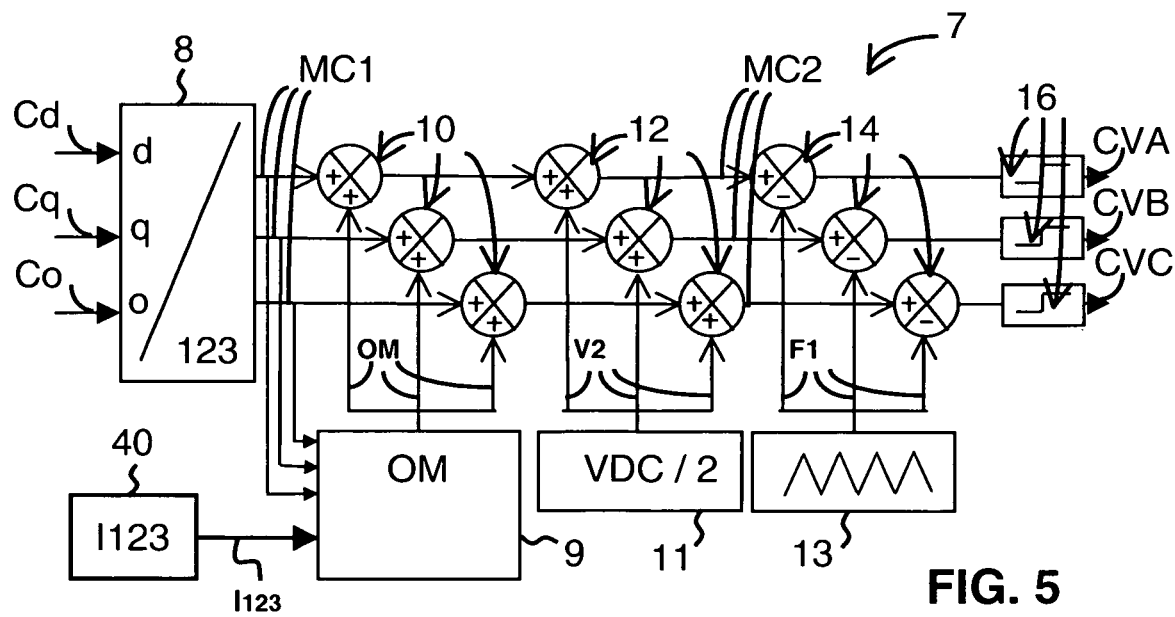
FIG. 5 represents a diagram of a control device according to an embodiment of the invention.

In FIG. 5 a control device of an electric power converter according to an embodiment of the invention comprises a control circuit 6 controlling turn-on of said legs 2A, 2B, 2C of the converter 2. The control circuit 6 comprises a processing unit 7 to supply modulation signals MC1, MC1A, MC1B, MC1C, MC2 of control signals of said legs, and a module 9 for determining a general control component OM for processing an over-modulation. Said general control component OM is determined according to first modulation signals MC1, MC1A, MC1B, MC1C of the legs of the conversion means to process second modulation signals MC2, MC2A, MC2B, MC2C of the legs of the converter. In this device according to an embodiment of the invention, the module 9 for determining comprises a detection module 22 for detecting a signal 23 of current I123 flowing in the outputs of the legs of said converter to be used in selection of at least one modulation signal receiving an over-modulation. The module 9 for determining determines said general control component OM according to the first modulation signals and according to said detection signal 23 detected by the detection module 22.

The detection signal is preferably representative of an output line, or a phase in a three-phase power system. Detection is preferably performed in instantaneous current, quasi-instantaneous current, or current signals with a small lag or a low integration.

A converter generally comprises DC voltage supply lines L1 and L2, a converter 2 having at least three legs 2A, 2B, 2C connected between the DC voltage lines L1 and L2 and outputs to convert said DC voltage into output AC voltages VO, and a control circuit 6 controlling turn-on of the legs 2A, 2B, 2C. In an embodiment of the invention, a converter also comprises at least one control device as defined above and current measuring sensors 40 arranged on output conductor lines 61 and connected to said control device to supply signals I123 representative of currents to the module 9 for determining to be used in determining the general control component OM.

Figure 6:
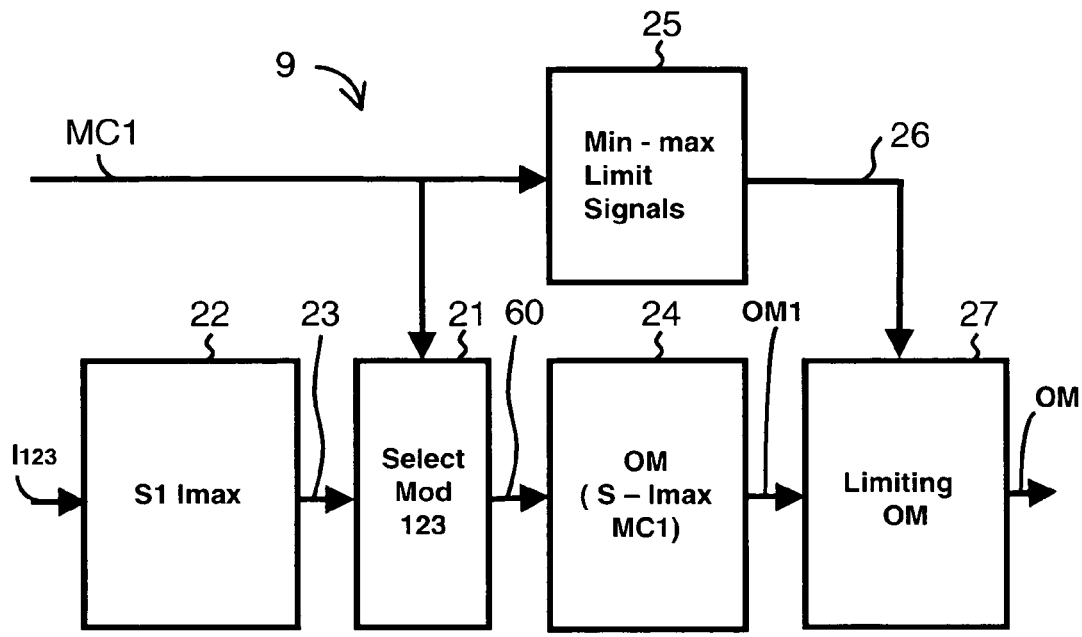
FIG. 6 represents a diagram of a module for determining a general control component according to a first embodiment of the invention.

The detection module detects a first signal detection representative of a highest current in absolute value to supply a first detection signal acting as over-modulation reference. The module 9 for determining thus comprises, for example, processing modules to supply a first general control component OM with over-modulation dependent on said first detection signal. An embodiment of such a module is represented in the block diagram of FIG. 6. A detection module 22 receives the current signals I123 and detects the line or output where the current is the highest. It supplies a detection signal 23 to a selection module 21 to select a reference modulation signal 60. This selection can be performed, for example, in the form of a scalar matrix or product. Then a module 24 determines a first general control component signal OM1 according to the modulation and/or detection signals.

In this diagram, a module 25 for determining limiting values receives modulation signals MC1 to supply negative and positive limiting values 26 defining, for example, a limiting zone. The signals 26 and the first general control component OM1 are supplied to a module 27 controlling limiting of the general control component. On output of the module 27, a general control component OM is limited without any risk of overshoot.

To improve control of limiting, the detection module detects a second detection signal 23B of a high current lower than the first highest in absolute value current and supplies a second detection signal 60B acting as over-modulation reference. In this case, the module for determining comprises second processing modules to supply a second general control component with over-modulation dependent on said second detection signal.

Figure 7:
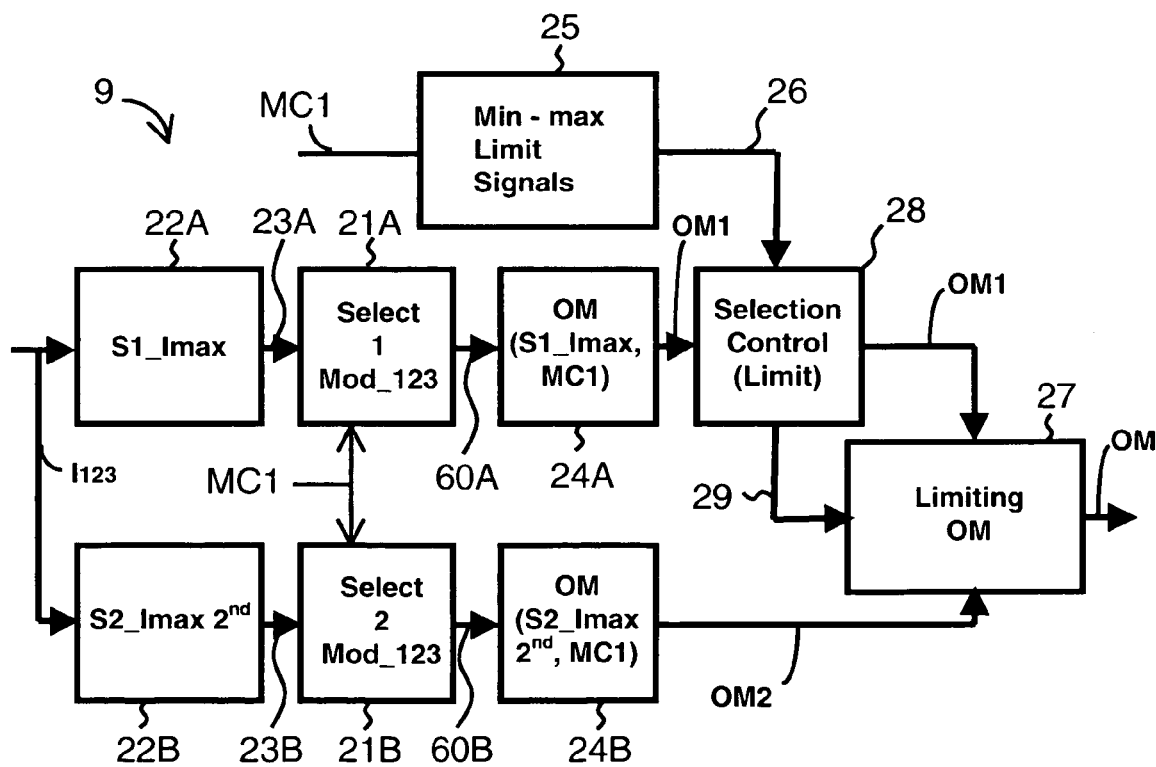
FIG. 7 represents a diagram of a module for determining a general control component according to a second embodiment of the invention.

FIG. 7 represents an example of a module for determining the general control component with two detections of detection signals enabling optimal over-modulation. A first detection module 22A receives the current signals I123 and detects the line or output where the current is the highest in absolute value. It supplies a first detection signal 23A to a first selection module 21A to select a first reference modulation signal. Then a module 24A determines a first general control component signal OM1 according to the first modulation and detection signals. A second detection module 22B receives the current signals I123 and detects the line or output where the current is the second highest in absolute value. It supplies a second detection signal 23B to a second selection module 21B to select a second reference modulation signal. Then a module 24B determines a second general control component signal OM2 according to the second modulation and detection signals. A module 25 receives modulation signals MC1 and supplies negative and positive limiting values 26 defining a limiting zone.

In the diagram of FIG. 7, a module 27 controlling limiting of the general control component receives a first signal representative of the first general control component OM1 dependent on said first detection signal, a second signal representative of a second general control component OM2 dependent on said second detection signal, and a control signal 29 representative of a risk of over-modulation overshoot supplied by an over-modulation overshoot detection module 28. The overshoot detection module 28 enables the module 27 controlling limiting to supply a general control component OM representative of the first general control component OM1 if a risk of overshoot is not detected or of the second general control component OM2 if a risk of overshoot is detected.

The choice or replacement of signals to supply a different control component can also be made on other signals of the processing chains. For example, a module 27 for controlling limiting of the general control component can select a detection signal representative of said first detection signal 23A if a risk of overshoot is not detected or representative of said second detection signal 23B if a risk of overshoot is detected to determine a general control component OM.

FIG. 8 shows an example of modulation signals MC1, MC1A, MC1B and MC1C standardized between −1 and +1. FIG. 9 shows examples of limiting signals corresponding to a positive limiting signal 30 and to a negative limiting signal 31. A limiting zone 32 is defined between these two signals.

An example of a module 25 for determining limiting values is represented in FIG. 10. It comprises a first module 35 giving a positive maximum value 30 of the modulation signals MC1A, MC1B, and MC1C and a second module 36 giving a negative maximum value 31 of the modulation signals MC1A, MC1B, and MC1C.

An example of a detection module 22 is represented in FIG. 11. It comprises a module 37 giving an absolute value of the current signals I123 and a module 38 giving an indication of the maximum current signal.

Figure 12:
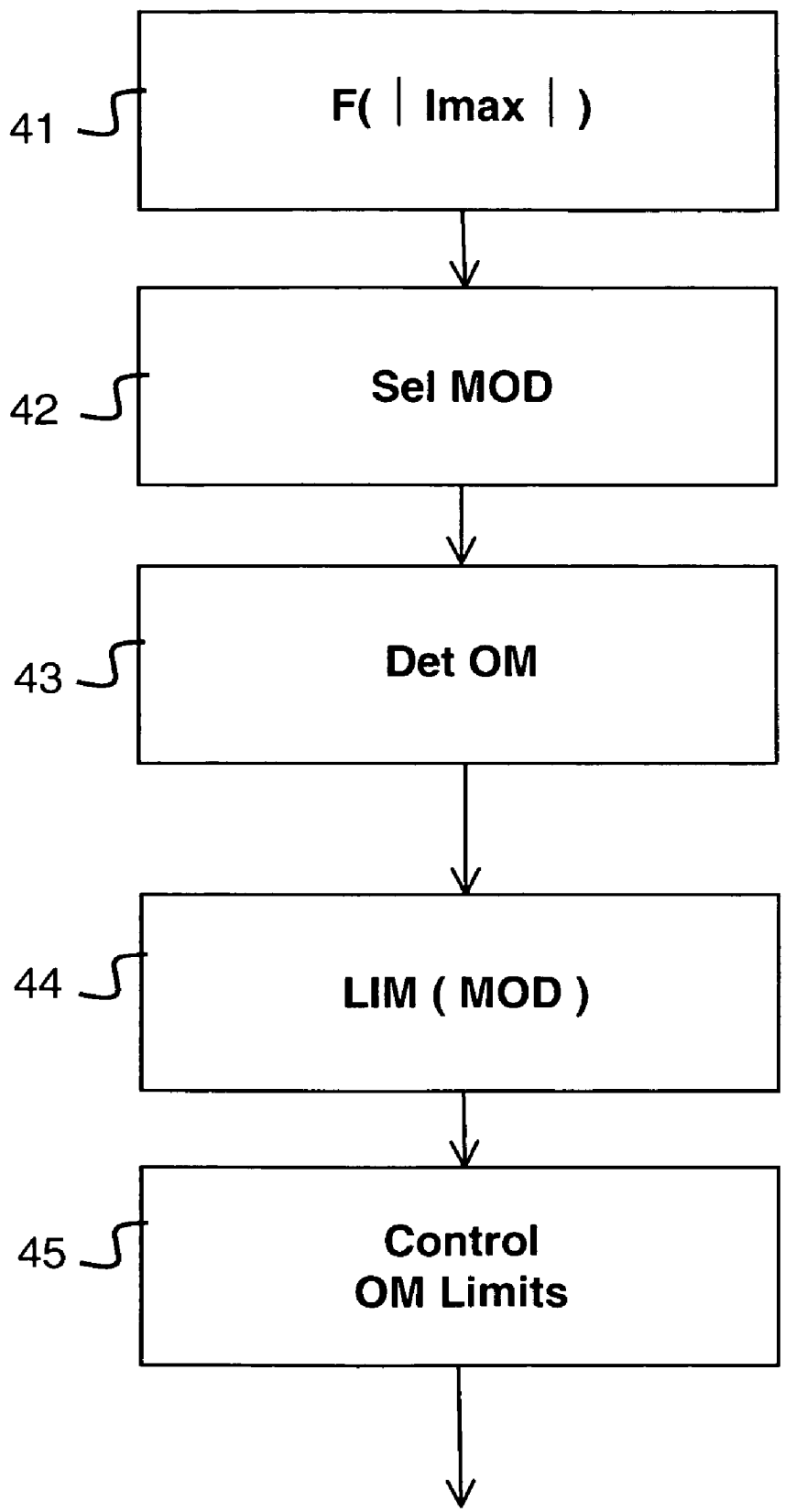
FIG. 12 represents a flowchart according to a first example of a method according to the invention.

FIG. 12 shows a first method for controlling an electric power converter according to an embodiment of the invention comprising a converter 2 having at least three legs connected between DC voltage lines and outputs to convert said DC voltage into output AC voltages, and a control circuit 6 controlling turn-on of the converter legs and comprising processing means to supply modulation signals of control signals of said legs.

This method in particular comprises a step 41 of detection of a detection signal representative of a highest current of a line where a highest current absolute value is flowing and a step 42 of selection of a modulant signal for application of an over-modulation. In a step 43, a general control component OM is determined according to signals resulting from detection of said detection signal and selection of a modulant signal.

To prevent risks of over-modulation overshoot, a step 44 enables limit values of the general control component or of the over-modulation to be computed. Then a step 45 comprises control of limiting of the general control component according to said limit values.

Figure 13:
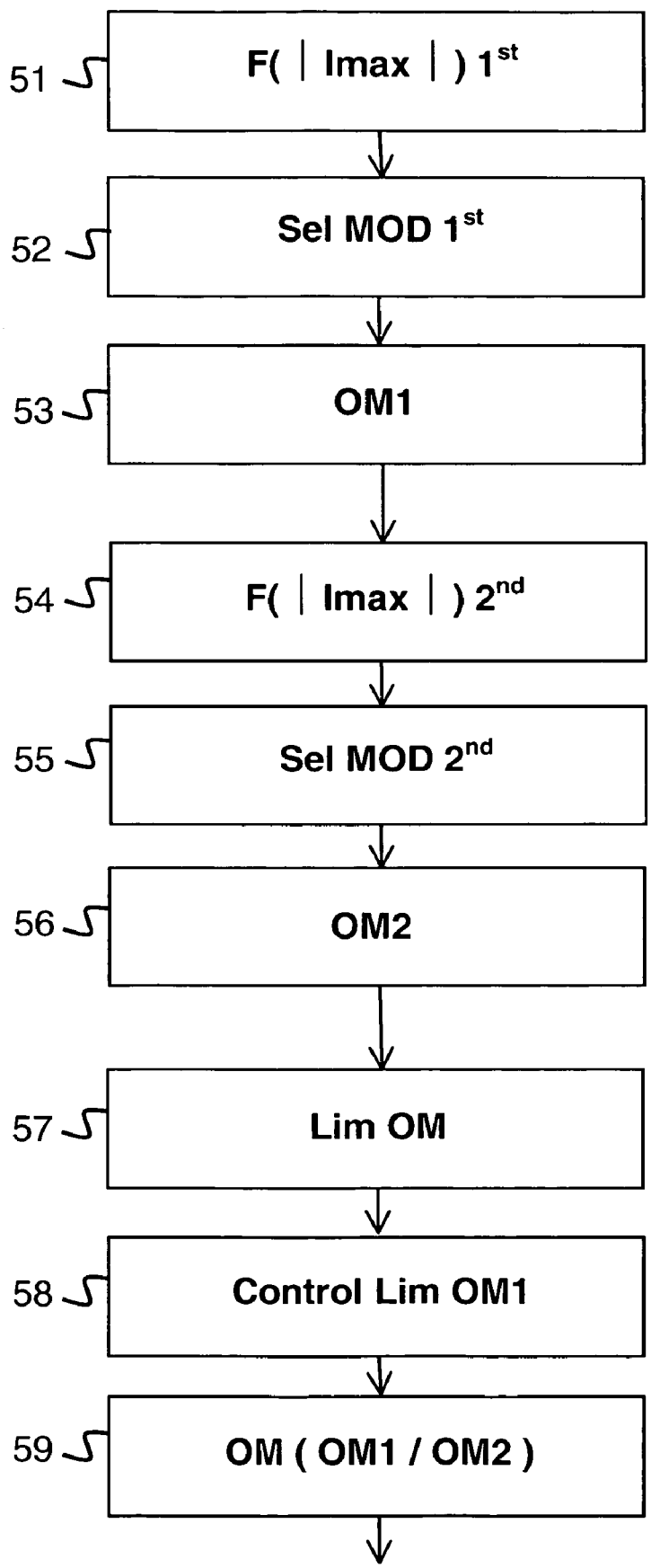
FIG. 13 represents a flowchart according to a second example of a method according to the invention.

FIG. 13 shows a second method for controlling an electric power converter according to an embodiment of the invention. In this method, a first detection 51 detects a first detection signal representative of a highest current or of a line where a highest current in absolute value is flowing, and a first selection selects a first modulant signal, at a step 52, for application of an over-modulation. In a step 53, a first determining of a general control component OM1 is determined according to signals resulting from the first detection of a first detection signal, and from the first selection of a modulant signal. A second detection step 54 detects a second detection signal representative of a second highest signal or a line where a high current lower than the first highest current in absolute value is flowing. A second selection, in a step 55, selects a second modulant signal for application of an over-modulation. In a step 56, a second determining of a second general control component is determined according to signals resulting from the second detection of a second detection signal, and from the second selection of a modulant signal.

This method comprises computation of limit values of the general control component or of over-modulation in a step 57, and control of limiting of the first general control component to detect a risk of overshoot of the limit values in a step 58. Then a step 59 supplies a signal of a general control component OM representative of the first general control component OM1 if a risk of overshoot is not detected or of the second general control component OM2 if a risk of overshoot is detected.

FIG. 14A illustrates limiting signals 30 and 31 of the general control component defined according to the first modulation signals MC1. FIG. 14B illustrates signals of the general control components OM1 and OM2 according to the risks of overshoot. Thus, for example, between the times t1 and t2 the component OM1 is chosen in priority, then between the times t2 and t3 the component OM2 is chosen due to a risk of overshoot of the limits by the component OM1. In FIG. 14C the general control component OM which will be applied to the modulation signals is the resultant of the components OM1 and OM2 selected for a maximum efficiency and according to the risks of overshoot. The operation of such a control device according to an embodiment of the invention is dynamic and adapts itself continually to the current nature and values.

FIG. 15A shows modulation signals MC2A, MC2B, MC2C on which a control component OM is applied and FIG. 15B shows examples of signals I123 of currents IA, IB, IC measured on the output lines 61 of the converter. In this figure, over-modulation is of "Flat top" type consisting, in this case, in forcing turn-on of transistors of the legs when the current is at a maximum to reduce the losses, voltage regulation being performed in the other legs.

In FIGS. 15A and 15B, at a time t5, the current IA is the highest and over-modulation is on the modulation signal MC2A of the corresponding line. Then, at the time t6, the highest current is the current IC and the second highest current is the current IA. Over-modulation is still on the signal MC2A but it corresponds to the second highest signal to avoid a risk of limit overshoot. At a time t7, the highest current is IC and over-modulation switches to the signal MC2C corresponding to modulation of the leg of the same line or output as the current IC. Then at a time, t8 the strongest current is IB and the second strongest signal of less high value than IB is the current IC. In this case, to avoid overshoot risks, over-modulation is on MC2C.

The figures show regular signals; but the invention also and especially applies to currents having forms, amplitudes and phase shifts that can be very different even for each phase.

Conversion devices according to embodiments can in particular be inverters, uninterruptible power supplies, speed variators, one-way or two-way power converters, or frequency converters.

The invention applies in particular to three-phase converters with three legs or four legs in particular when a neutral or common leg is used, but other converters having a different number of legs and/or phases can be concerned.

The invention applies in particular to converters in which the legs operate at two levels, but it also applies when the legs operate at multiple output voltage levels.

The semi-conductors of these converters are advantageously insulated gate bipolar transistors called IGBT but other types of semi-conductors can be used. The legs can comprise several semi-conductors connected in series and/or in parallel according to the electrical voltages, currents or powers used. For example, the input or output voltages can range from a few tens of volts to a thousand volts for low-voltage power system applications or have voltages of several thousand volts in particular in medium-voltage applications. The input or output currents can range from a few amperes to over a thousand amperes.

In an other technical language, the legs of the converter can be also named arms or stages.

The invention claimed is:

1. A device for controlling an electric power converter, comprising:
    DC voltage supply lines,
    conversion means having at least three legs connected between said DC voltage supply lines and outputs, said conversion means for converting said DC voltage into output AC voltages, and
    control means for controlling turn-on of said legs of the conversion means, said control means comprising:
        processing means for receiving first modulation signals of control signals of said legs and outputting at least one corresponding modulation signal,
        current detection means for detecting at least a first current in at least one of the outputs of the legs of said conversion means, and
        means for generating an over-modulation control signal, wherein said means for generating an over-modulation control signal is for receiving a first detection signal from said current detection means corresponding to the detected first current, selecting at least one modulation signal of the first modulation signals for receiving an over-modulation, and for generating a first over-modulation control signal according to such first detection signal and such first modulation signals.

2. The device according to claim 1, wherein said first detection signal is representative of an output line or of a phase in a three-phase system.

3. The device according to claim 1, wherein the current detection means generate such first detection signal by detecting instantaneous current, quasi- instantaneous current, or a small lag of the first current.

4. The device according to claim 1, wherein said current detection means detect which output of the conversion means has a highest current in absolute value and supply such first detection signal as an over-modulation reference, and said means for generating an over-modulation control signal supply such first over-modulation control signal dependent on such first detection signal or on a modulation signal selected according to such first detection signal.

5. The device according to claim 1, wherein said means for generating an over-modulation control signal comprise means for controlling limiting of the over-modulation control signal.

6. The device according to claim 5, wherein said means for controlling limiting of the over-modulation control signal receive modulation signals to supply negative and positive limiting values defining a limiting zone.

7. The device according to claim 5, wherein said current detection means detect which output of the conversion means has a high current lower than a highest current in absolute value of one of the outputs of the conversion means and supply a second detection signal as an over-modulation reference, said means for generating an over-modulation control signal comprising second processing means and for supplying a second with over-modulation control signal dependent on such second detection signal or on a second modulation signal selected according to such second detection signal.

8. The device according to claim 7, wherein said means for controlling limiting receive:
 a first signal corresponding to such first detection signal or a modulation signal selected according to such first detection signal,
 a second signal corresponding to such second detection signal or a modulation signal selected according to such second detection signal, and
 a control signal representative of a risk of over-modulation overshoot supplied by means for detecting an overshoot,
 wherein said means for controlling limiting determine at least one of such first and second over-modulation control signals by supplying a detection or modulation signal representative of such first detection signal if a risk of overshoot is not detected or representative of such second detection signal if a risk of overshoot is detected.

9. A device according to claim 7, wherein said means for controlling limiting receive:
 a first signal representative of a such first over-modulation control signal dependent on such first detection signal,
 a second signal representative of a such second over-modulation control signal dependent on such second detection signal, and
 a control signal representative of a risk of over-modulation overshoot supplied by means for detecting an overshoot,
 wherein said means for controlling limiting supply an over-modulation control signal representative of the first over-modulation control signal if a risk of overshoot is not detected or representative of the second over-modulation control signal if a risk of overshoot is detected.

10. An electric power converter comprising:
 at least one device for controlling an electric power converter according claim 1; and
 current measuring means on output conductor lines and connected to said control device for supplying signals representative of currents to said means for determining and over-modulation control signal.

11. A method for controlling an electric power converter comprising conversion means having at least three legs connected between said DC voltage lines and outputs to convert said DC voltage into output AC voltages, control means for controlling turn-on of the legs of said conversion means and comprising processing means for supplying modulation signals of control signals of said legs, said method comprising:
 detecting at least one current level,
 generating a first detection signal representative of an absolute current value of a first output of the conversion means, the first output being the output of the conversion means with the highest absolute current value:
 selecting a first modulation signal for applying a first over-modulation, and generating a first over-modulation control signal according to signals resulting from detection of said detection signal, and from selection of a modulation signal.

12. The method according to claim 11, further comprising computing a limit for values of the first over-modulation control signal or of over-modulation.

13. The method according to claim 12, further comprising limiting the first over-modulation control signal according to said limit values.

14. The method according to claim 11, further comprising:
 generating a second detection signal representative of a current of a second output of the conversion means, the second output being an output with a high current that is lower than the absolute current value of the first output,
 selecting a second modulation signal for applying an over-modulation, and
 determining a second over-modulation control signal according to the second detection signal and the second modulation signal.

15. The method according to claim 14, further comprising:
computing limit values of the first and second over-modulation control signals or of over-modulation,
 limiting the first over-modulation control signal to detect a risk of overshoot of the limit values, and
 supplying an over-modulation control signal representative of the first common control component if a risk of overshoot is not detected or representative of the second over-modulation control signal if a risk of overshoot is detected.

* * * * *